US012719770B1

(12) United States Patent
Guberman

(10) Patent No.: US 12,719,770 B1
(45) Date of Patent: Aug. 25, 2026

(54) ACTIONABLE ANALYTICS BASED ON VIRTUAL ON-WATCH (VOW) DATA

(71) Applicant: Bank of America Corporation, Charlotte, NC (US)

(72) Inventor: Arthur Guberman, Freehold, NJ (US)

(73) Assignee: Bank of America Corporation, Charlotte, NC (US)

( * ) Notice: Subject to any disclaimer, the term of this patent is extended or adjusted under 35 U.S.C. 154(b) by 37 days.

(21) Appl. No.: 19/062,248

(22) Filed: Feb. 25, 2025

(51) Int. Cl.
*H04L 43/04* (2022.01)
*H04L 41/16* (2022.01)
*H04L 41/5054* (2022.01)

(52) U.S. Cl.
CPC .............. *H04L 43/04* (2013.01); *H04L 41/16* (2013.01); *H04L 41/5054* (2013.01)

(58) Field of Classification Search
None
See application file for complete search history.

(56) References Cited

U.S. PATENT DOCUMENTS 9,658,081 B2 5/2017 Vaswani et al.
11,403,393 B1 8/2022 Satish
11,902,117 B1 2/2024 Guberman et al.
2018/0075397 A1 3/2018 Ronen et al.
2019/0278646 A1 9/2019 Fernandez et al.
2020/0186411 A1* 6/2020 Ravichandran ..... H04L 41/0618
2020/0192743 A1 6/2020 Harper et al.
2021/0081265 A1 3/2021 Mariyappa et al.
2022/0066856 A1 3/2022 Agarwal et al.
2022/0247678 A1* 8/2022 Atwal ................ H04B 7/18519
2022/0311655 A1 9/2022 Han et al.
2023/0333887 A1* 10/2023 White .................. G06F 9/5033
2024/0220389 A1* 7/2024 Wu ....................... G06F 11/079

* cited by examiner

*Primary Examiner* — Fadi Haj Said
(74) *Attorney, Agent, or Firm* — Weiss & Arons LLP

(57) ABSTRACT

A method executing self-healing of a network of computing devices is provided. The method receives an application programming interface (API) call at a WebEx bridge platform. The platform includes one or more life-cycle electronic bridges storing electronic bridge information. The method uses a virtual on watch (VOW) processing system to generate, enable, or otherwise interact with the electronic bridges. The method monitors each of the bridges using a large language model and monitoring system (LLM) and receives and structures data received from the bridges. In response to a demand from a remediation system for executing self-healing algorithms at the one or more life-cycle electronic bridges, the method remediates an application that deviates at greater than a threshold value from a historical baseline trend, responds to an elevated triage resource consumption level, said elevation that deviates from a baseline triage resource consumption level, and mitigates post-triage deployment occurrences.

14 Claims, 14 Drawing Sheets

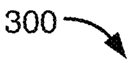
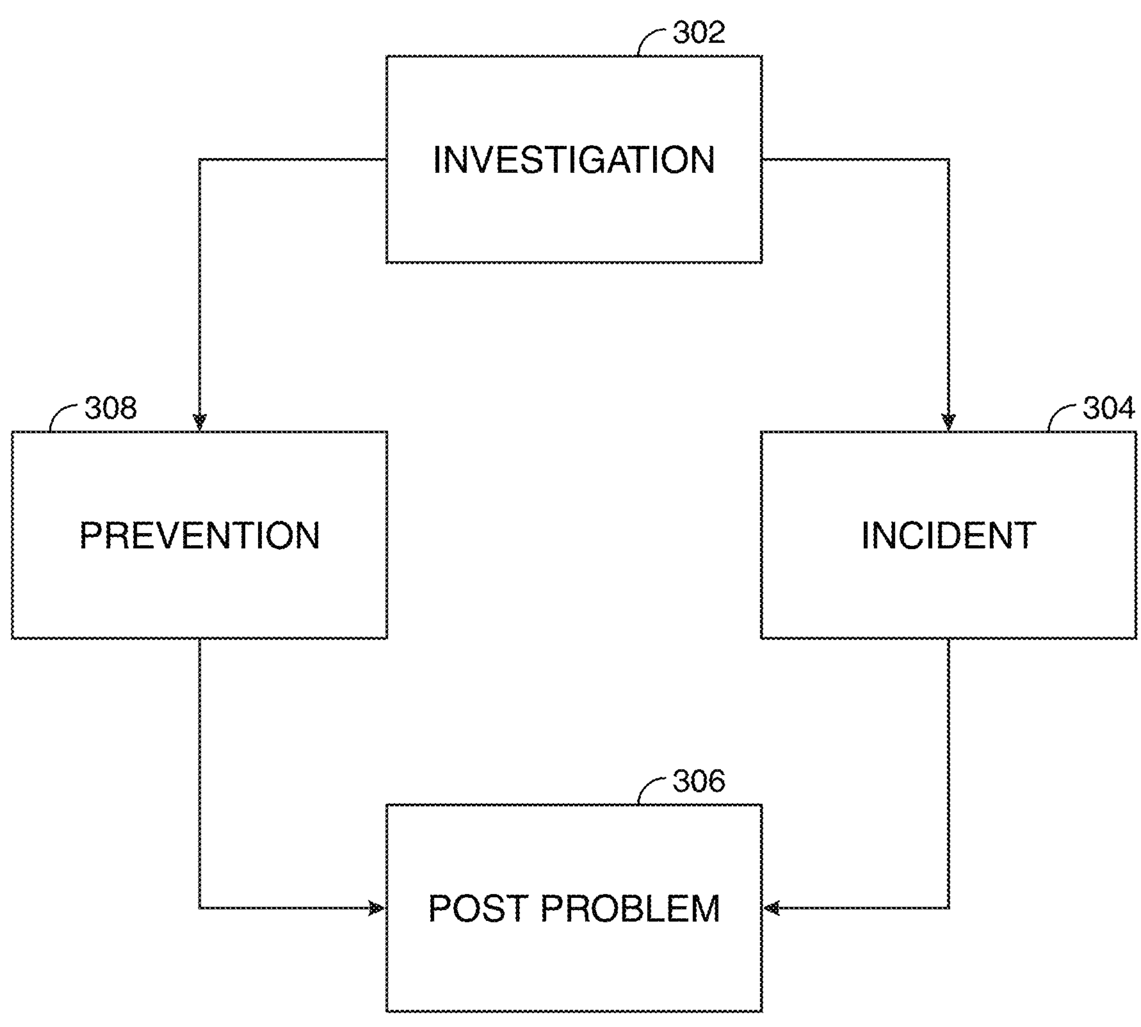
FIG. 3

602

Incident Number: LCB000000000507 | AIT Number: 0

△ Bridge Details

604

| Brief Description | |
|---|---|
| Customer Experience: | Customer impact currently being confirmed by operations/support teams. |
| Status Update: | As of 15:40 on 11/12/2024: Engaging production support and operations teams for triage and investigation. |

606

| Reservation Call Type: | Prevention |
|---|---|
| Webex: | Join Here |
| Workroom (Mattermost): | LCB000000000507 |

608

| Linked TicketID Impacted AIT: | |
|---|---|
| Impact Status: | Active |
| Owned By: | APS Others |

610

| Heightened Awareness: | No |
|---|---|
| Priority: | NA |
| Impact: | NA |
| Urgency: | NA |
| Special Event: | No |

612

| Call Leader: | |
|---|---|
| Incident Manager: | John Doe (ABC Others) |
| Region: | |
| Domains involved: | |

614

| Caused by Change: | |
|---|---|
| Event Start: | |
| Bridge Start: | 11/12/2024 15:40 |
| In Recess: | No |
| Network Engaged: | |

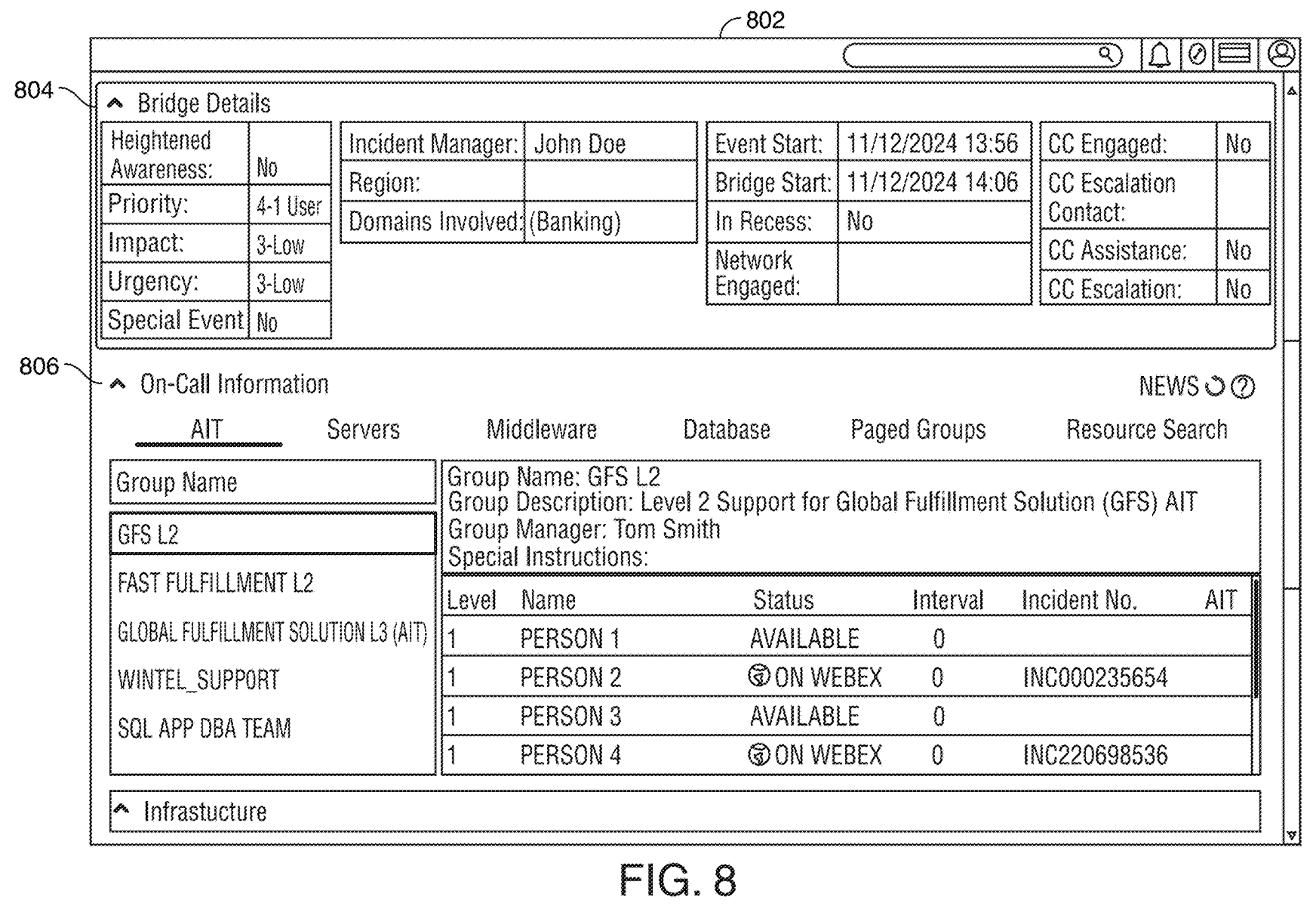

804 Bridge Details

| Heightened Awareness: | No |
| --- | --- |
| Priority: | 4-1 User |
| Impact: | 3-Low |
| Urgency: | 3-Low |
| Special Event | No |

| Incident Manager: | John Doe |
| --- | --- |
| Region: | |
| Domains Involved: | (Banking) |

| Event Start: | 11/12/2024 13:56 |
| --- | --- |
| Bridge Start: | 11/12/2024 14:06 |
| In Recess: | No |
| Network Engaged: | |

| CC Engaged: | No |
| --- | --- |
| CC Escalation Contact: | |
| CC Assistance: | No |
| CC Escalation: | No |

806 On-Call Information

NEWS

AIT Servers Middleware Database Paged Groups Resource Search

Group Name

GFS L2

FAST FULFILLMENT L2

GLOBAL FULFILLMENT SOLUTION L3 (AIT)

WINTEL_SUPPORT

SQL APP DBA TEAM

Group Name: GFS L2
Group Description: Level 2 Support for Global Fulfillment Solution (GFS) AIT
Group Manager: Tom Smith
Special Instructions:

| Level | Name | Status | Interval | Incident No. | AIT |
| --- | --- | --- | --- | --- | --- |
| 1 | PERSON 1 | AVAILABLE | 0 | | |
| 1 | PERSON 2 | ON WEBEX | 0 | INC000235654 | |
| 1 | PERSON 3 | AVAILABLE | 0 | | |
| 1 | PERSON 4 | ON WEBEX | 0 | INC220698536 | |

Infrastucture

FIG. 8

ACTIONABLE ANALYTICS BASED ON VIRTUAL ON-WATCH (VOW) DATA

FIELD OF THE DISCLOSURE

Aspects of this disclosure relate to monitoring and mitigating Information Technology (IT) incidents. Specifically, the disclosure relates to monitoring and mitigating IT incidents that cause a loss of service.

BACKGROUND OF THE DISCLOSURE

Internal technology (IT) support teams typically do not have any access into ongoing investigations conducted by other support teams. Nor does software that is dedicated to arranging and forming these IT support team bridges, such as Virtual On-Watch as described in U.S. Pat. No. 11,902,117, filed on Nov. 18, 2022, and entitled, "Virtual On-Watch", which is hereby incorporated by reference herein in its entirety, structure information related to multiple bridges.

It would be desirable to provide systems and methods that structure information related to multiple bridges.

It would be further desirable to provide systems and methods that capture and retrieve, automatically and/or upon command, resources dedicated to ongoing, past and future bridges.

It would be further desirable to provide systems and methods that analyze time and efforts dedicated to ongoing, past and future bridges.

In addition, it would be still further desirable to provide systems and methods that analyze trends associated with time and efforts dedicated to ongoing, past and future bridges.

SUMMARY OF THE DISCLOSURE

Pursuant to the objects set forth above, an end-to-end triage management process that provides early indication of upcoming triages is disclosed herein. Such a process may include a method for providing virtual monitoring of a set of computing devices. The method may include receiving a report of a service outage incident in a computer network.

Some embodiments of the disclosure relate to using a WebEx bridge in real-time to collect operational and functional data to determine the root cause and appropriate recovery steps, and to collect operational and functional data to provide actionable analytics. Such data may be structured to provide various data categories, and to store the raw data according to category. Such categories may include use of electronic bridges, attendance at electronic bridges, paging to call respondents to electronic bridges, actions by or using electronic bridges, status updates derived from electronic bridges, incident communications transmitted to or from electronic bridges, transcripts of the call, of messaging associated with a call, or of electronic mail associated with a call, response data and other collected data to analyze ongoing outages on an entity's network and automate responses thereto.

Some aspects of the disclosure relate to invoking mobilization procedures by automatically instantiating a bridge, automatically mobilizing resources and suggesting one or more courses of action based on a model-based issue evaluation.

Some embodiments may invoke self-heal capabilities based on the model-based issue evaluation. In some cases, the embodiments may feed real time status reports for the self-heal attempt directly into the bridge for executing automated self-healing actions.

In other embodiments, the feedback data may be directed into the model to determine effectiveness and next steps as well as to continually train and re-train the model in an automated way.

The system may include a WebEx bridge platform including one or more life-cycle electronic bridges. The life-cycle electronic bridges preferably includes electronic bridge information. The WebEx bridge platform preferably includes a receiver for receiving an API call to the WebEx bridge platform requesting the electronic bridge information.

The system may also include a virtual on watch (VOW) processing system. The processing system may generate, enable, or otherwise interact with the one or more life-cycle electronic bridges. The life-cycle electronic bridges may serve as an electronic staging area to respond to a service outage incident.

The VOW may include a processor, a memory and communications lines coupled to the processor, the memory and each of the life-cycle electronic bridges. The VOW may further include a large language model and monitoring system (LLM). The LLM may include a database for receiving and structuring data from the one or more life-cycle electronic bridges.

The system may also include an on-demand remediation system for executing self-healing algorithms at the one or more life-cycle electronic bridges. The self-healing algorithms may remediate an application that deviates at greater than a threshold value from a historical baseline value or trend. The self-healing algorithms may respond to an elevated triage resource consumption level. The self-healing algorithms may be invoked when the elevated triage resource consumption level deviates at greater than a threshold value from a baseline triage resource consumption level. The self-healing algorithms may be invoked for mitigating an increased number of post-triage deployment occurrences.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which:

FIG. 3 shows an illustrative flow diagram in accordance with the principles of the disclosure;

FIG. 6 shows another illustrative bridge detail report in accordance with the principles of the disclosure;

FIG. 8 shows an illustrative group information screen;

DETAILED DESCRIPTION OF THE DISCLOSURE

Figure 1:
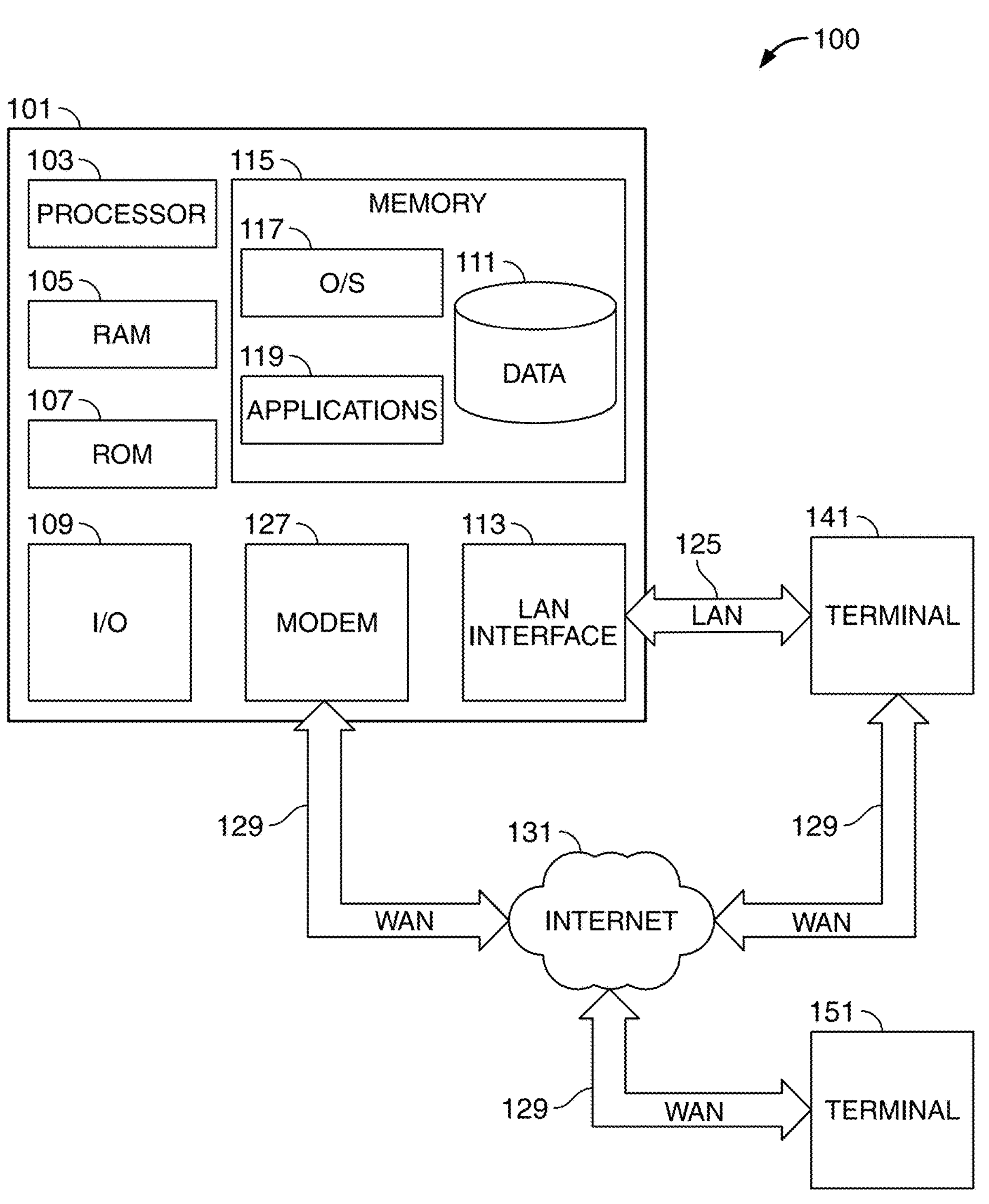
FIG. 1 shows illustrative apparatus in accordance with principles of the disclosure.

A system for executing self-healing of a network of computing devices is provided. The system may include a WebEx bridge platform including one or more life-cycle electronic bridges. The life-cycle electronic bridges preferably includes electronic bridge information. The WebEx bridge platform preferably includes a receiver for receiving an API call to the WebEx bridge platform requesting the electronic bridge information.

The system may also include a virtual on watch (VOW) processing system. The processing system may generate, enable, or otherwise interact with the one or more life-cycle electronic bridges. The life-cycle electronic bridges may serve as an electronic staging area to respond to a service outage incident.

The VOW may include a processor, a memory and communications lines coupled to the processor, the memory and each of the life-cycle electronic bridges. The VOW may further include a large language model and monitoring system (LLM). The LLM may include a database for receiving and structuring data from the one or more life-cycle electronic bridges.

The system may also include an on-demand remediation system for executing self-healing algorithms at the one or more life-cycle electronic bridges. The self-healing algorithms may remediate an application that deviates at greater than a threshold value from a historical baseline trend. The self-healing algorithms may respond to an elevated triage resource consumption level. The self-healing algorithms may be invoked when the elevated triage resource consumption level deviates at greater than a threshold value from a baseline triage resource consumption level. The self-healing algorithms may be invoked for mitigating an increased number of post-triage deployment occurrences.

In certain embodiments of the disclosure, the LLM may be further adapted to monitor for infrastructure failures, review reported symptoms, identify issues impacting user experience, and monitor for and review dynamic volume thresholds and dynamic impact thresholds.

The LLM may also be further operable to investigate one or more life-cycle electronic bridges to determine whether the one or more life-cycle electronic bridges relate to infrastructure failures.

The LLM may investigate one or more life-cycle electronic bridges to determine whether the one or more life-cycle electronic bridges relate to symptomatic behavior.

The LLM may also investigate one or more life-cycle electronic bridges to determine whether the one or more life-cycle electronic bridges relates to multiple issues impacting a single service; investigate one or more life-cycle electronic bridges to determine whether the one or more life-cycle electronic bridges relates to volume thresholds; and/or investigate one or more life-cycle electronic bridges to determine whether the one or more life-cycle electronic bridges relates to consumer-facing impact thresholds.

The LLM may be further configured to invoke mobilization procedures by automatically instantiating an additional life-cycle electronic bridge.

A system may perform virtual monitoring of a set of computing devices as follows. The system may include a receiver for receiving a report of a service outage incident in a computer network. The system may include a life-cycle electronic bridge. The electronic bridge may serve as an electronic staging area to respond to the service outage incident. The system may include a transmitter for transmitting an Application Programming Interface (API) call for all bridge information available in the computer network. The system may also include a WebEx bridge platform. The WebEx bridge platform may be operable to receive the API call for bridge information. The bridge information may include all of a plurality of electronic bridges that are currently being hosted by the WebEx bridge platform. The bridge information may include a plurality of responders that are currently involved in at least one of the plurality of electronic bridges.

The processor may be in electronic communication with the WebEx bridge platform. The set of responders should be capable of responding to the incident, should not be listed among the plurality of responders that are currently involved in at least one of the plurality of electronic bridges, and should be electronically listed on the WebEx bridge as available to join the life-cycle electronic bridge.

In some embodiments, the WebEx bridge platform may be further configured to send an electronic prompt to the at least one of the set of responders to join the life-cycle electronic bridge and to add the life-cycle electronic bridge to the plurality of electronic bridges that are currently being hosted by the WebEx bridge platform.

The processor may be further operable to determine a root cause for each report of service outage incident in the computer network. For each root cause, the WebEx bridge platform may be configured to determine an average number of responders for an electronic bridge formed in response to the report of a service outage associated with the root cause. Based on the determination, the WebEx bridge platform may adjust the response to the API call to be in electronic communication to obtain the average number of responders. For each root cause, the life-cycle electronic bridge may be operable to determine an average duration of the life-cycle electronic bridge. Based on the average duration of the life-cycle electronic bridge for each root cause, the life-cycle electronic bridge may determine an expiry time, and then, terminate at the expiry time, the life-cycle bridge.

In some embodiments, an average life-cycle for a bridge event may include a bridge start date/time and a bridge expiry date/time. The WebEx bridge platform may be further operable to determine, between the bridge start date/time and the bridge expiry date/time, peak activity intervals. Such peak activity intervals may be useful in throttling up or down the number of responders active on the bridge.

The WebEx bridge platform may be further operable to determine for each root cause, preferably prior to the arranging of the electronic bridge, whether a legacy electronic bridge exists that relates to each root cause.

When a legacy electronic bridge that relates to a root cause exists, the WebEx bridge platform may be further operable to classify the legacy electronic bridge that relates to the root cause as relational to the root cause, and flag the legacy electronic bridge with a root cause flag. The root cause flag identifies the root cause to which the legacy electronic bridge is directed.

The WebEx bridge platform may be further operable to add the electronic bridge to a set of legacy electronic bridges that all relate to the root cause.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional, and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods. Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of system 100 that includes computer 101. Computer 101 may alternatively be referred to herein as an "engine," "server," or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all of the elements and apparatus of system 100.

Computer 101 may include processor 103 for controlling the operation of the device and its associated components, and may include RAM 105, ROM 107, input/output ("I/O") 109, and a non-transitory or non-volatile memory 115. Machine-readable memory may be configured to store information in machine-readable data structures. Processor 103 may also execute all software running on the computer. Other components commonly used for computers, such as EEPROM or flash memory or any other suitable components, may also be part of computer 101.

Memory 115 may include any suitable permanent storage technology, such as a hard drive. Memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129 but may also include other networks. When used in a LAN networking environment, computer 101 may connect to LAN 125 through LAN interface 113 or an adapter. When used in a WAN networking environment, computer 101 may include modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface (API). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks.

The invention may be described in the context of computer-executable instructions, such as application(s) 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
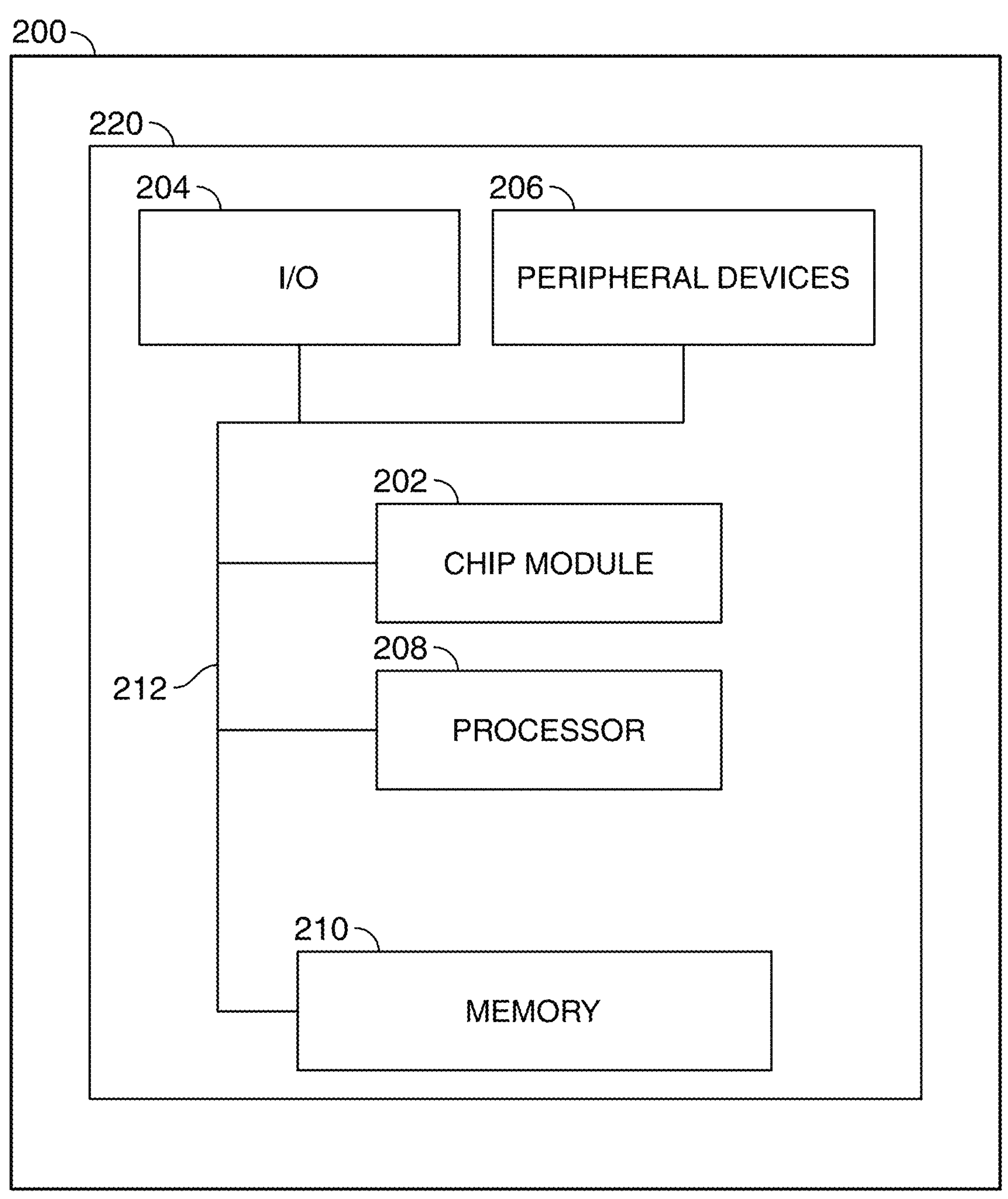
FIG. 2 shows illustrative apparatus in accordance with principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 2. Apparatus 200 may include chip module 202, which may include one or more integrated circuits, and which may include logic configured to perform any suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 219, signals, and/or any other suitable information or data structures.

Components 202, 204, 206, 208, and 210 may be coupled together by a system bus or other interconnections 212 and may be present on one or more circuit boards such as circuit board 220. In some embodiments, the components may be integrated into a single chip. The chip may be silicon-based.

FIG. 3 shows an illustrative flow diagram of a life cycle bridge flow in accordance with the principles of the disclosure. At the beginning of the life-cycle, an investigation 302 of an incident is initiated. Investigation 302 may lead to one or more outcomes.

Investigation 302 may lead to creating a bridge to deal with an incident 306.

Investigation 302 may lead to taking steps to prevent further incidents, as shown at prevention 304.

Either prevention step 304 or incident 306 or both prevention step 304 and incident 306 may lead to a post-problem analysis as shown at 308. Post-problem analysis 308 may utilize AI analysis to make corrections to future investigation, and responses based thereon or tuned thereto, in order to implement corrective, self-healing, measures to avoid future incidents.

Figure 4:
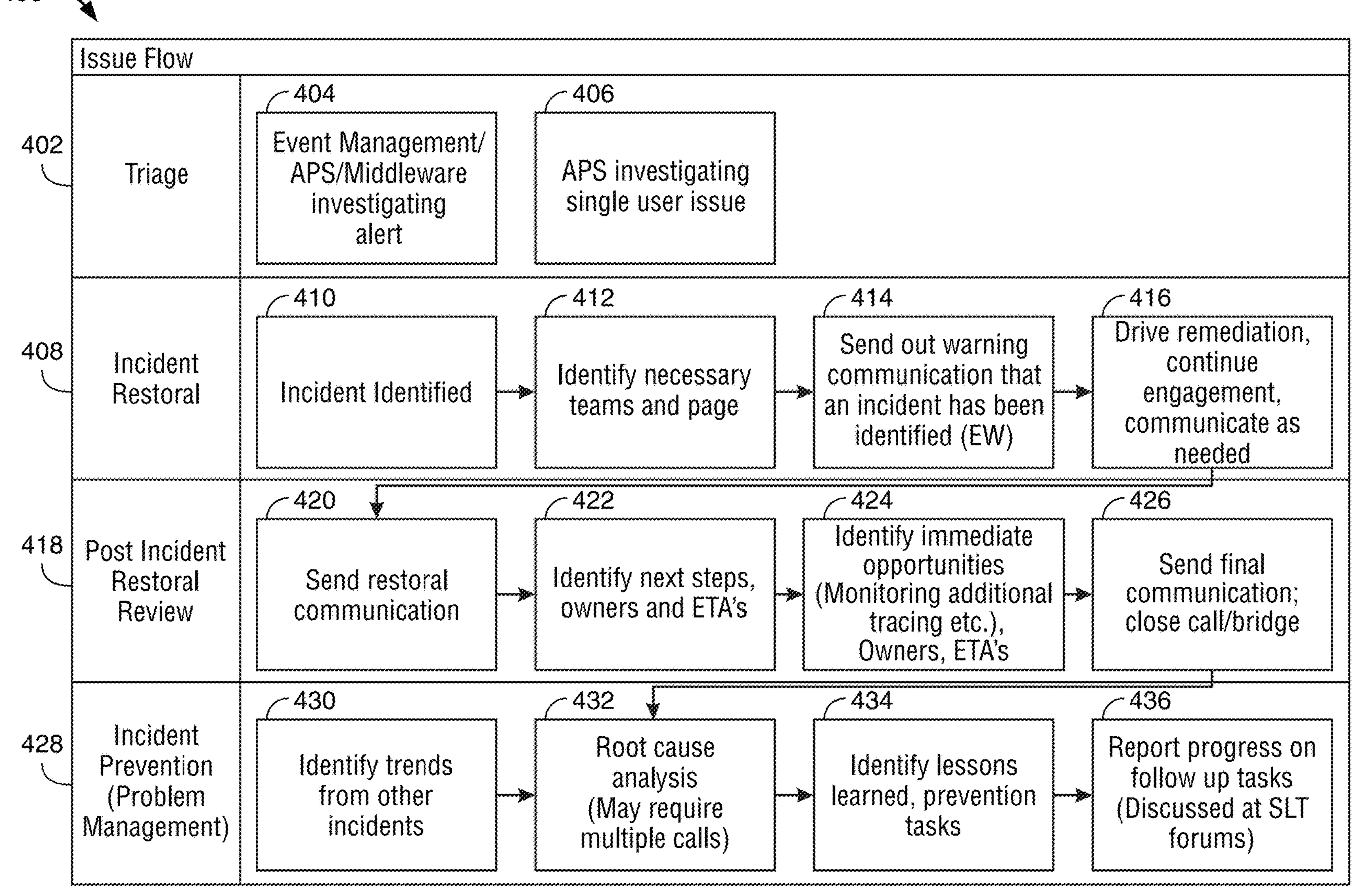
FIG. 4 shows another illustrative flow diagram in accordance with the principles of the disclosure.

FIG. 4 shows an illustrative flow diagram of issue flow 400 in a life cycle bridge in accordance with the principles of the disclosure. Swim lanes 402, 408, 418, and 428 are shown in issue flow 400. Specifically, issue flow includes triage lane 402, incident restoral lane 408, post incident restoral review lane 418 and incident prevention (problem management) lane 428.

Triage lane 402 includes an entry for event management/Application Production Services "APS"/middleware investigating alert 404. Triage lane 402 also includes an entry involving an APS dedicated to investigating a single-user issue 406.

Incident restoral lane 408 includes incident identification 410, identification of necessary teams and pages 412, and one or more relevant responders release of a warning communication 414 that an incident has been identified. Finally, incident restoral lane 408 shows driving remediation, continuing engagement and communicating as needed 416.

At this point, post incident restoral review lane 418 is invoked. Post-incident restoral review 418, which continues from driving remediation, etc., shows sending restored communication 420 followed by (or substantially simultaneously thereto) identifying next steps, owners of incidents, and estimated times of arrival (ETAs) for follow-up communications 422.

Thereafter, post incident restoral review 418 may include identifying immediate opportunities (monitoring, additional tracking, etc.) owners of same and ETAs for same 424.

Finally, post incident restoral review 418 may include sending a final communication, and closing the call or bridge 426.

A swim lane dedicated to incident prevention (problem management) 428 may follow post-incident rostral review 418. Incident prevention 428 may include root call analysis. Root cause analysis may receive input from the final communication. Root cause analysis may retrieve trends as identified as desired from other incidents 430. Root cause analysis may require multiple calls to fully obtain information for the root cause 432.

It should be noted that, in some embodiments, the final communication and/or closing the call or bridge 426 may be timed to coincide with the average time of expiry for a call or bridge associated with the same root cause as the current event.

Root cause analysis may further identify trends and lessons learned as well as tasks for prevention of future outage incidents 434. Root cause analysis may also provide a progress report reflective of follow-up tracks discussed at SLT forums 436 (Senior Leadership Team), a venue to discuss various topics with management team.

Such identified trends may include trends at an entity level. For example, entity level trends may include trends associated with a geo-defined area. In such a geo-defined trend, an area, like the Southeastern United States (the "Southeast"), may trend toward a greater number of reported service outage incidents. Accordingly, service outage incident self-healing mitigation steps, preferably related to the root cause of the upward trending service outage incidents, can be directed and applied based on the geo-definition of the recovered trend.

More specifically, if a software disruption occurred in the Southeast of the network of automated teller machines (ATMs) associated with the entity, then a self-healing reboot of the network of ATMs, as well as the various devices and peripherals associated with the ATMs of the network in the Southeast, can be applied absent human intervention.

Such an application of self-healing can preferably obtain surprisingly efficient results because of the ability to time the self-healing to off-hours and selected locations or regions, as well as to leverage past knowledge of such self-healing attempts. Such an application of self-healing may involve coupling an AI processor to a Large Language Model (LLM) and monitoring system equipped to detect patterns similar to the patterns detected among the reported service outage incidents. Thereafter, the AI processor may mine a solution (or solutions), while considering current issues associated with the service outage incidents. Thus, the solution (or solutions) preferably leverages real-time and historical information to create a GenAI solution for the entity. Once mined by the AI processor, the solution (or solutions) may be used to self-heal the reported service outage incidents.

In some embodiments, an indication of an entity trend may enable the entity to not only manage the trending service outage incidents in the area in which the service outage incidents are occurring, but to also enable the entity to manage the trending service outage incidents in the area in which the service outage incidents have not yet began to trend. This shared knowledge may significantly reduce the trending service outage incidents throughout the full extent of the network. Surprisingly, this shared knowledge may help avoid the future occurrence of service outage incidents in regions where such service outage incidents never even occurred, thus increasing the mean time to failure (MTTF) of the regions where such service outage incidents never even occurred.

Such identified trends may include trends at a unit level within the entity. For example, unit level trends may include trends associated with a pre-determined technology. In such a unit/technology trend, a unit dedicated to payment systems may trend toward a greater number of returned payments. Accordingly, self-healing mitigation steps, preferably related to the root cause of the upward trending returned payment incidents, can be directed and applied to create a solution closely-tailored to the payment systems technology. One such example of failure relating to payment systems may include receiving numerous NACK (non-acknowledgment) signals from one or more designated payment recipients.

In such circumstances, a self-healing algorithm for checking and verifying all the payment systems of the network can be applied absent human intervention. In other possible solutions, task bridges may be generated and pre-arranged to target payment system outages that have not yet materialized. Such an application of self-healing can preferably obtain surprisingly efficient results because of the ability to time the self-healing to off-hours and selected locations or regions, as well as to leverage past knowledge of such self-healing attempts.

In some embodiments, an indication of a unit trend may enable the entity to not only manage the trending service outage incidents in the area in which the service outage incidents are occurring, but also to enable the entity to manage the trending service outage incidents in the area in which the service outage incidents have not yet began to trend. This shared knowledge may significantly reduce the trending service outage incidents throughout the payment systems. Unexpectedly, this shared knowledge may help avoid the future occurrence of service outage incidents in the payment systems even in such payment systems where similar incidents never even occurred.

In yet other embodiments, trends may develop involving the number, or other characteristics, of bridges directed to one or more types of service outage incidents. For example, bridge trends may include trends associated with a bridge technology area, a bridge longevity trend, an order of bridge respondents trend—i.e., whether a certain bridge respondent is always the primary, secondary, etc., a number of bridges trend, a bridge respondent timing trend—i.e., which respondents are typically late to join a bridge or how long it takes a bridge to obtain full attendance, and/or a mean time to restoral (MTTR) pursuant to institution of the bridge.

Certain bridges may be defined as related to an increased number of reported service outage incidents. Accordingly, service outage incident self-healing mitigation steps, preferably related to the root cause of the upward trending service outage incidents, can be directed and applied based on the geo-definition of the recovered trend.

More specifically, if there was a software disruption in the Southeast of the network of automated teller machines (ATMs) associated with the entity, then a self-healing reboot of the network of ATMs, as well as the various devices and peripherals associated with the ATMs of the networks, in the Southeast can be applied absent human intervention.

Such an application of self-healing can preferably obtain surprisingly efficient results because of the ability to time the self-healing to off-hours and selected locations or regions, as well as to leverage past knowledge of such self-healing attempts. Such an application of self-healing may involve coupling an AI processor to a Large Language Model (LLM) and monitoring system equipped to detect patterns similar to the patterns detected among the reported service outage incidents. Thereafter, the AI processor may mine a solution (or solutions), while considering current issues associated with the service outage incidents. Thus, the solution (or solutions) preferably leverages real-time and historical information to create a GenAI solution for the entity. Once mined by the AI processor, the solution (or solutions) may be used to self-heal the reported service outage incidents.

In some embodiments, an indication of an entity trend may enable the entity to not only manage the trending service outage incidents in the area in which the service outage incidents are occurring, but to also enable the entity to manage the trending service outage incidents in the area in which the service outage incidents have not yet began to trend. This shared knowledge may significantly reduce the trending service outage incidents throughout the full extent of the network. Surprisingly, this shared knowledge may help avoid the future occurrence of service outage incidents in regions where such service outage incidents never even occurred.

Figure 5:
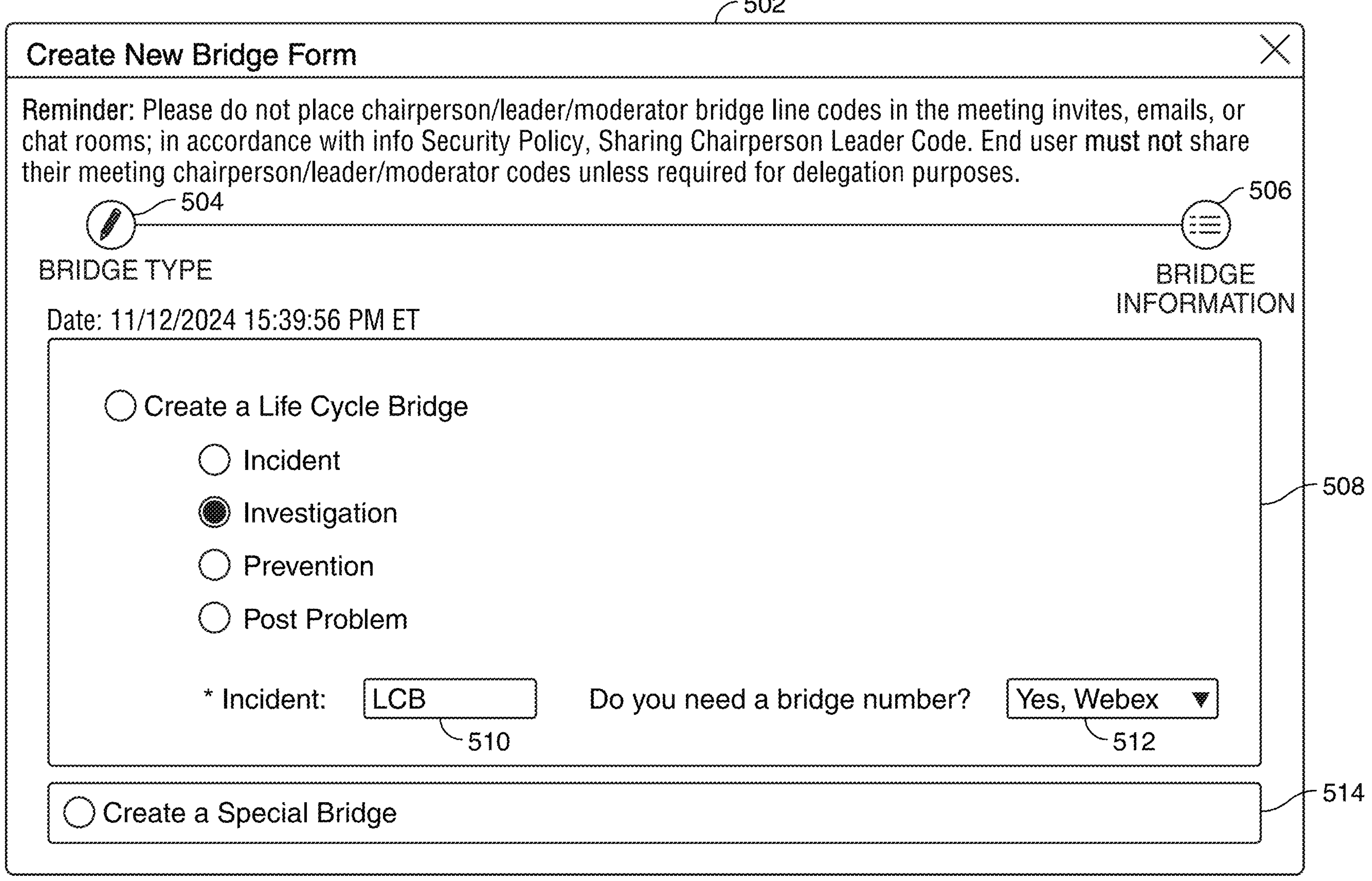
FIG. 5 shows an illustrative interactive graphical user interface ("GUI") in accordance with the principles of the disclosure.

FIG. 5 shows an illustrative interactive graphical user interface ("GUI") in accordance with the principles of the disclosure.

FIG. 5 also shows a GUI 502 for creating a new bridge form.

More specifically, triage lane 402 (in FIG. 4) may include an entry prompt for the disclosure of the incident or event. At 504, there is a prompt for the user to enter the bridge type for use with the overall life cycle bridge (LCB). At 506, bridge information is entered. At 508-*a* life cycle bridge entry screen is displayed.

The GUI 502 is generated with an indication that it is system-defined as an LCB. The user may be prompted, at 512, to select whether a bridge number (for entry into a storage location for LCBs) is requested, and, if so, then a definition as to technological requirements for the bridge—e.g., a selection of a Webex bridge—is also requested. At 514, a user may be prompted to select as to whether the event requires a special bridge.

In other words, creating a life cycle bridge may include creating an incident bridge, an investigation bridge, a prevention bridge and/or a post-problem bridge.

Creating a new bridge may, alternatively, involve creating a special bridge.

FIG. 6 shows another illustrative bridge detail report 602 in accordance with the principles of the disclosure. Illustrative bridge detail report 602 may include a bridge details section 604, reservation information 606, ticket information 608, criticality information 610, personnel information 612 and bridge facts 614.

Items listed on illustrative bridge detail report 602 are set forth in table 1.

TABLE 1

| Brief Description |
|---|
| Customer Experience |
| Status Update |
| Reservation Call Type |
| Webex |
| Workroom/Matter Most |
| Heightened Awareness |
| Priority |
| Impact |
| Urgency |
| Special Event |
| Call Leader |
| Incident Manager |
| Region |
| Domains Involved |
| Linked Ticket ID |
| Impacted AIT |
| Impact Status |
| Owned By |
| Caused by Charge |
| Event Status |
| Bridge Start |
| In Recess |
| Network Engaged |

Figure 7:
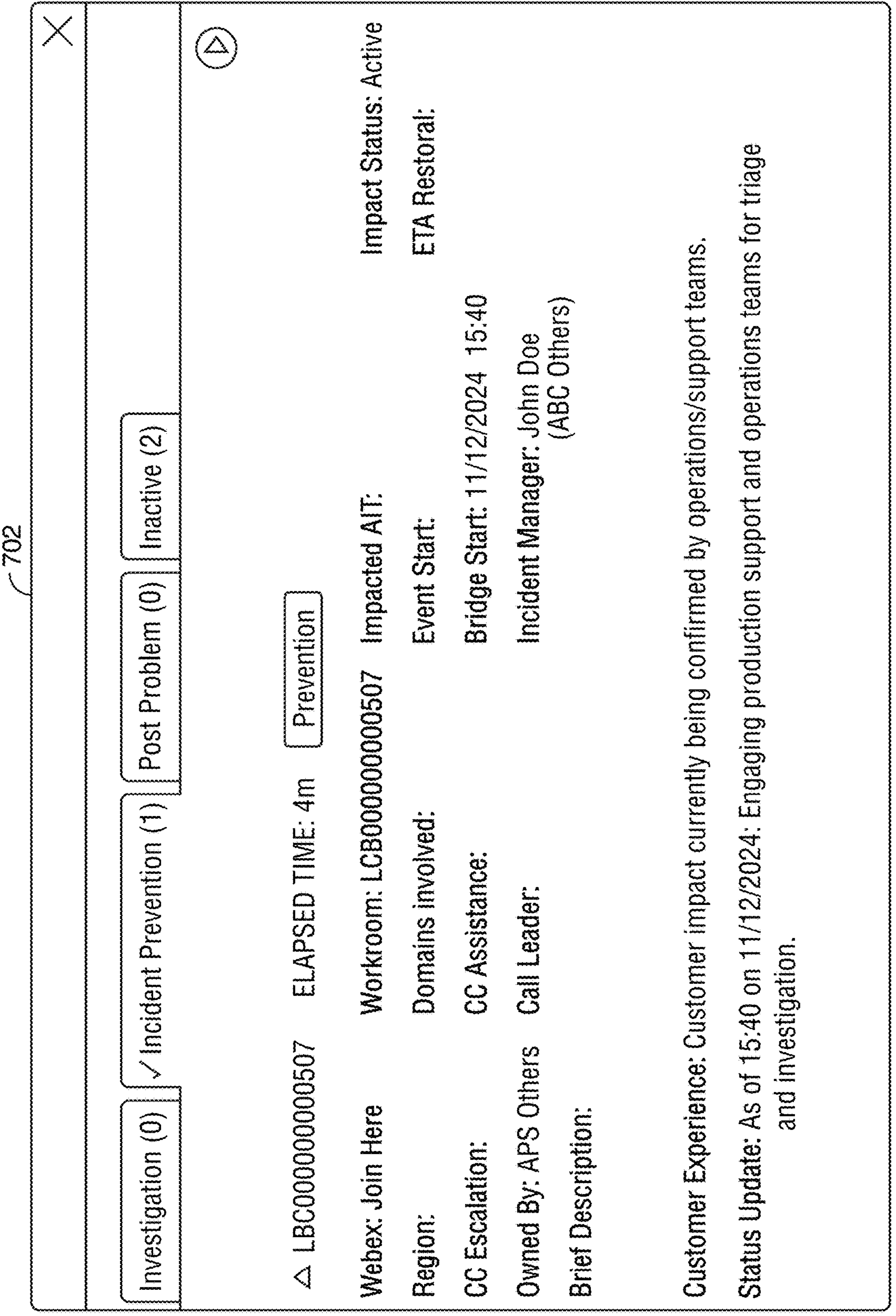
FIG. 7 shows an illustrative bridge screen in accordance with the principles of the disclosure.

FIG. 7 shows an illustrative bridge screen 702 in accordance with the principles of the disclosure. Specifically, illustrative bridge screen 702 may preferably be directed to incident prevention.

Items included in illustrative bridge screen 702 are set forth in Table 2.

TABLE 2

| Investigation |
|---|
| Incident Prevention |
| Post Problem |
| Inactive |
| Webex |
| Region |
| Escalation |
| Owned By |
| Brief Description |
| Customer Experience |
| Status Update |
| Workroom |
| Domain Involved |
| Assistance |
| Call Leader |
| Impacted AIT |
| Event Start |
| Bridge Start |
| Incident Manager |
| Impact Status |
| ETA Restored |

FIG. 8 shows an illustrative group information screen 802.

More specifically, FIG. 8 shows group information screen 802 including a group descriptor GUI. At 804, bridge details are displayed. At 806, responders for on-call information are displayed.

Items included in FIG. 8 are set forth in Table 3 below:

TABLE 3

| Group Name |
|---|
| Group Description |
| Group Manager |
| Special Instructions |
| Level of Team Member |
| Name of Team Member |
| Status of Team Member |

Figure 9:
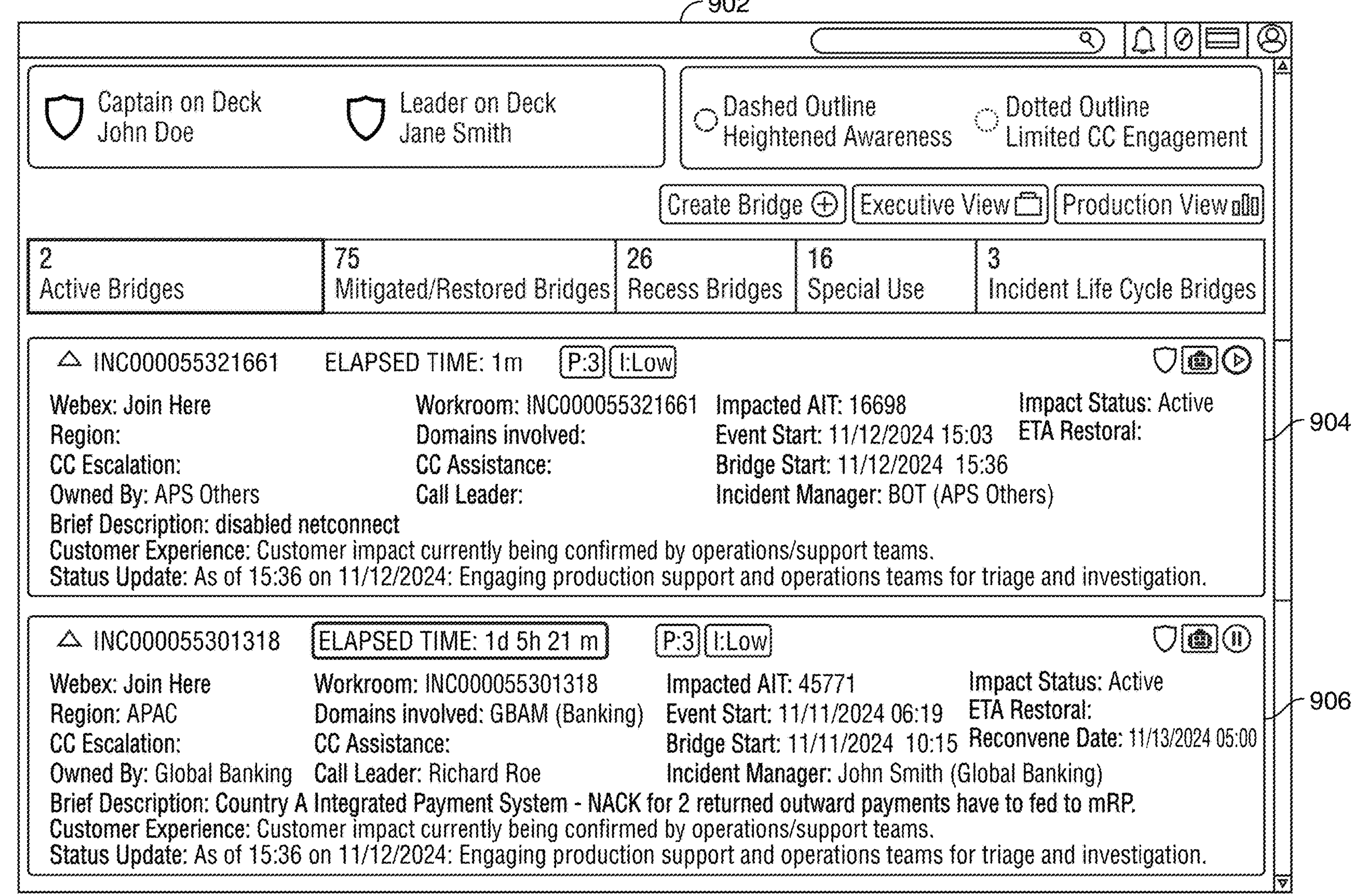
FIG. 9 shows an illustrative bridge screen in accordance with the principles of the disclosure.

FIG. 9 shows an illustrative aggregate bridge screen 902 in accordance with the principles of the disclosure. Illustrative aggregate bridge screen 902 shows multiple bridge screens 904, 906 preferably stacked one on top of the other in a vertical arrangement. Other arrangements of groups of bridge screens 904 and 906 are also contemplated as part of this disclosure. Such arrangements may be either system-set, or user-defined, at least in order to customize the display to a user preference.

In certain embodiments, a number and/or level of responders requested by an electronic bridge according to the disclosure may depend on the criticality, public-facing nature and/or the size of the outage—e.g., the percentage amount of the network affected or the number of devices affected. In certain embodiments, the number and/or level of responders may vary proportionally with the size of the outage.

In certain embodiments, a number and/or level of responders requested by an electronic bridge according to the disclosure may depend on the criticality, public-facing nature and/or the number of systems affected by the outage—e.g., software systems, hardware systems, hybrid software/hardware systems, customer-facing systems, non-customer facing systems, etc. In certain embodiments, the number and/or level of responders may vary proportionally with the number of systems affected by the outage.

As described above, certain embodiments may involve the selection of respondents along a two-dimensional array of responders. In such embodiments, both the level of the respondents, with respect to each of the respondents' level of technical acuity or other suitable characteristic, may form one dimension of the array, while the total number of selected respondents may form another dimension of the array. Thus, a request for respondents may vary in two dimensions. In some embodiments of the disclosure, more than two dimensions may be relevant to selection of respondents, and is, in fact, within the scope of the disclosure.

Figure 10A:
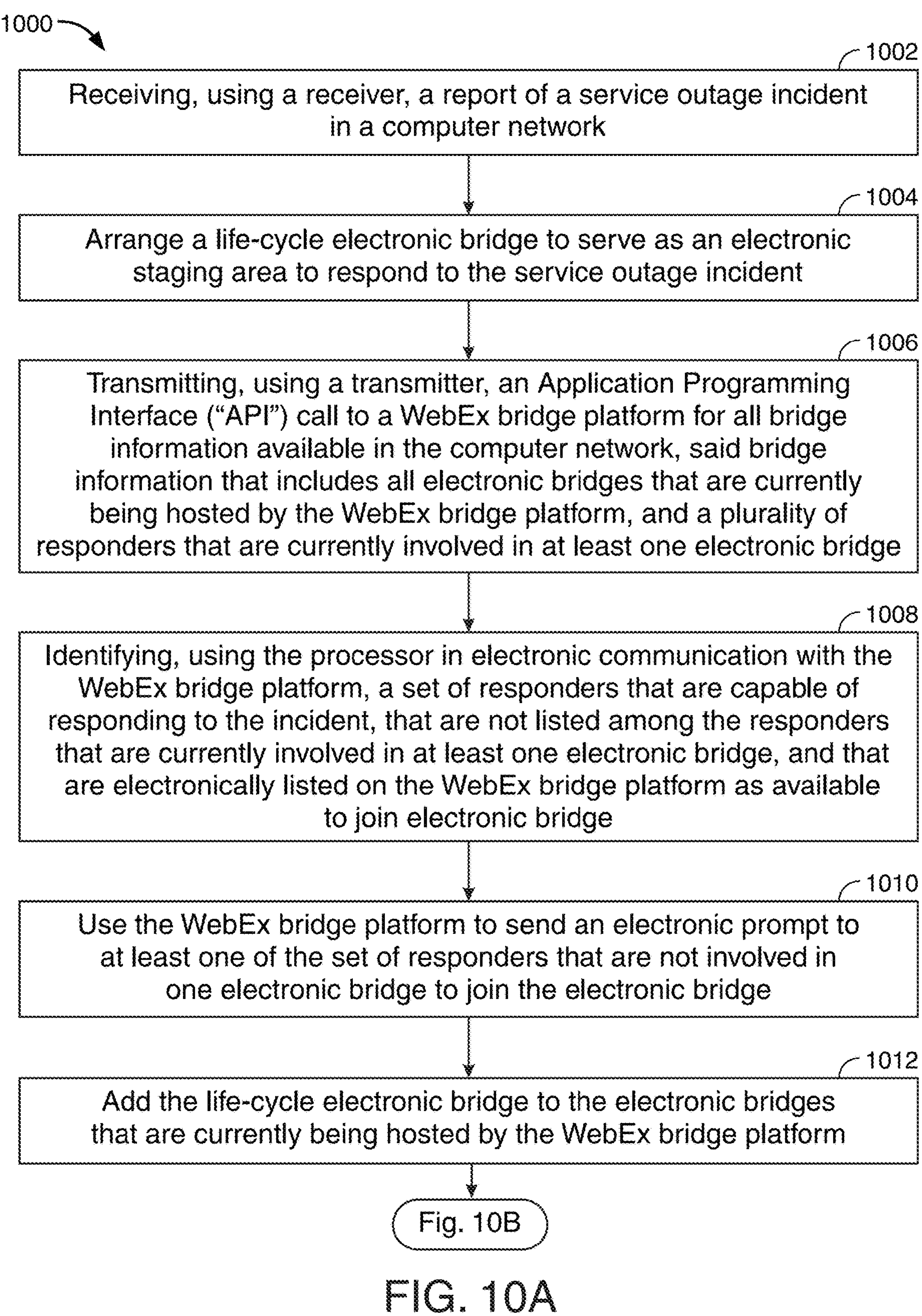
FIGS. 10A-B shows illustrative flow diagrams according to the principles of the disclosure.
Figure 10B:
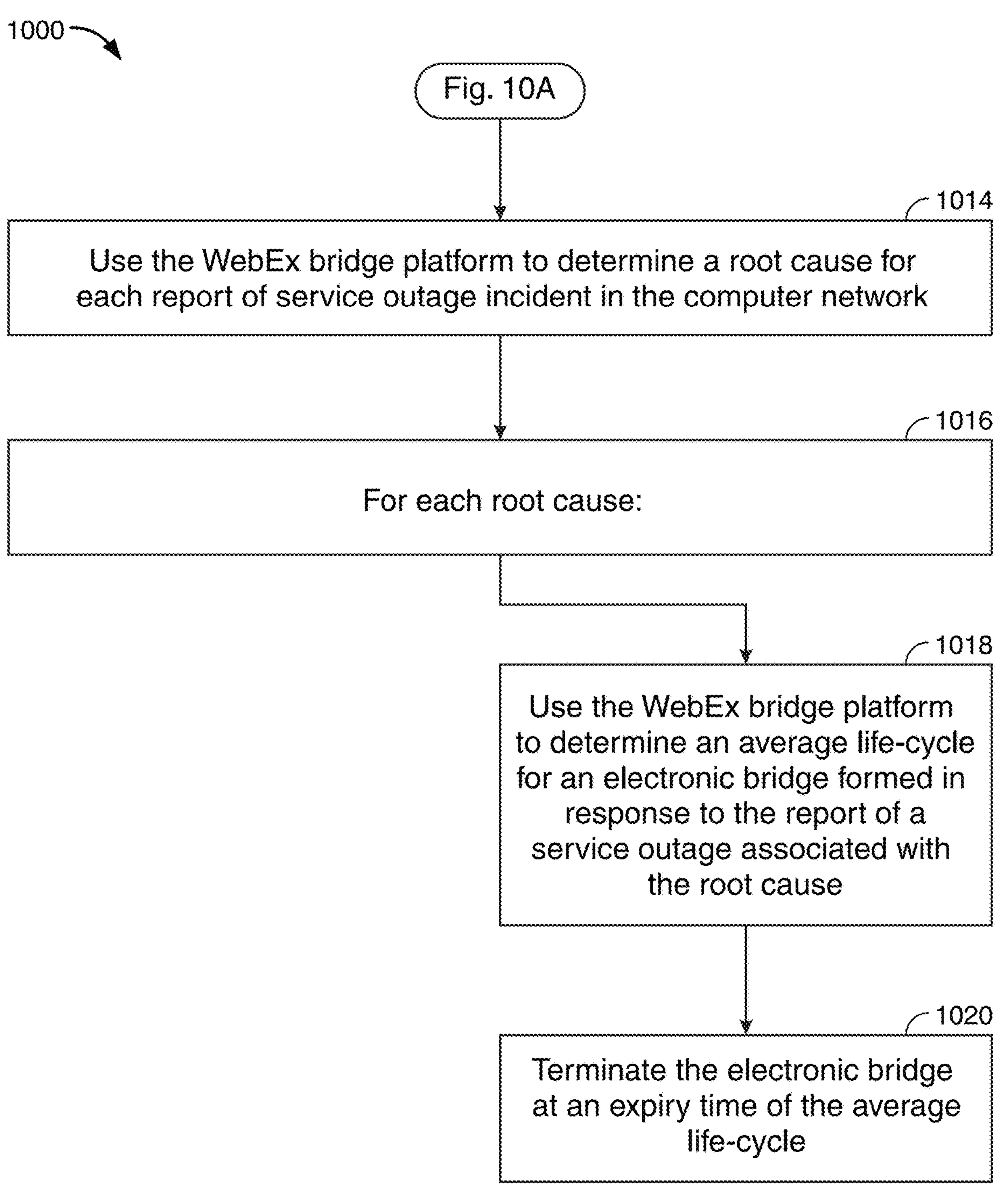

FIGS. 10A-B shows an illustrative flow diagram according to the principles of the disclosure. At 1002, a step of receiving a report of a service outage incident in a computer network is shown. At 1004, the method arranges a life-cycle electronic bridge to serve as an electronic staging area to respond to the service outage incident is shown.

At 1006, the method shows transmitting an API call to a WebEx bridge platform for all bridge information available in the computer network. The bridge information may include all of a plurality of electronic bridges that are currently being hosted by the WebEx bridge platform. The bridge information may further identify a plurality of responders that are currently involved in at least one of the plurality of electronic bridges.

Step 1006 may identify, using the processor in electronic communication with the WebEx bridge platform, a set of responders that are capable and available for responding to the incident, that are not listed among the plurality of responders that are currently involved in at least one of the plurality of electronic bridges, and that are electronically listed on the WebEx bridge platform.

Step 1010 involves using the WebEx bridge platform to send an electronic prompt to at least one of the responders to join the electronic bridge. At step 1012, the method adds the life-cycle electronic bridge to the plurality of electronic bridges that are currently being hosted by the WebEx bridge platform.

At 1014, the WebEx bridge platform may be used to determine a root cause for each report of service outage incident in the computer network. Then, for each root cause (see 1016), the WebEx bridge platform may be used to determine an average life-cycle for an electronic bridge formed in response to the report of a service outage associated with the root cause, as shown at 1018. Finally, the method may terminate the electronic bridge at an expiry time corresponding to the average life-cycle, as shown at 1020.

Figure 11A:
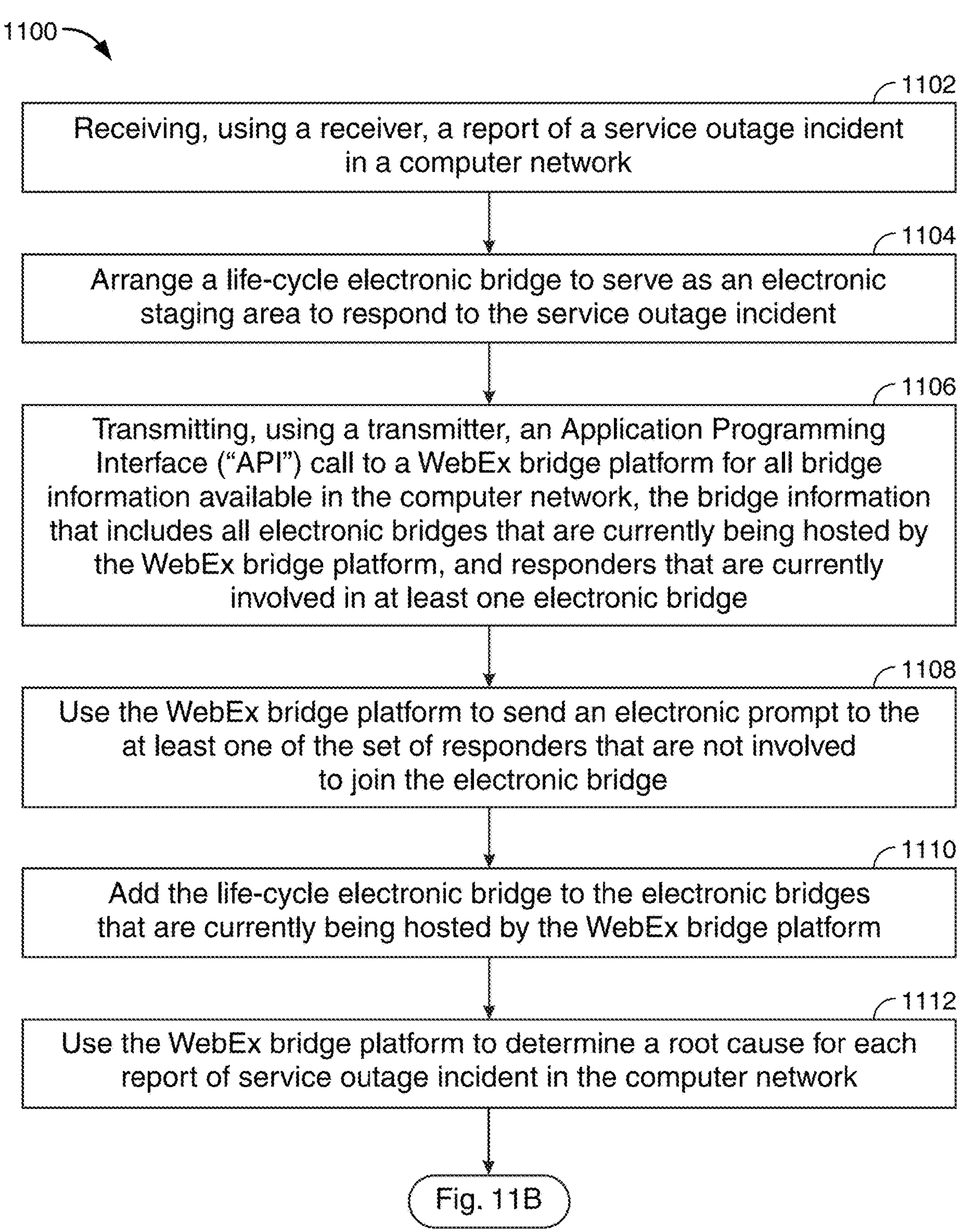
FIGS. 11A-B shows illustrative flow diagrams according to the principles of the disclosure.
Figure 11B:
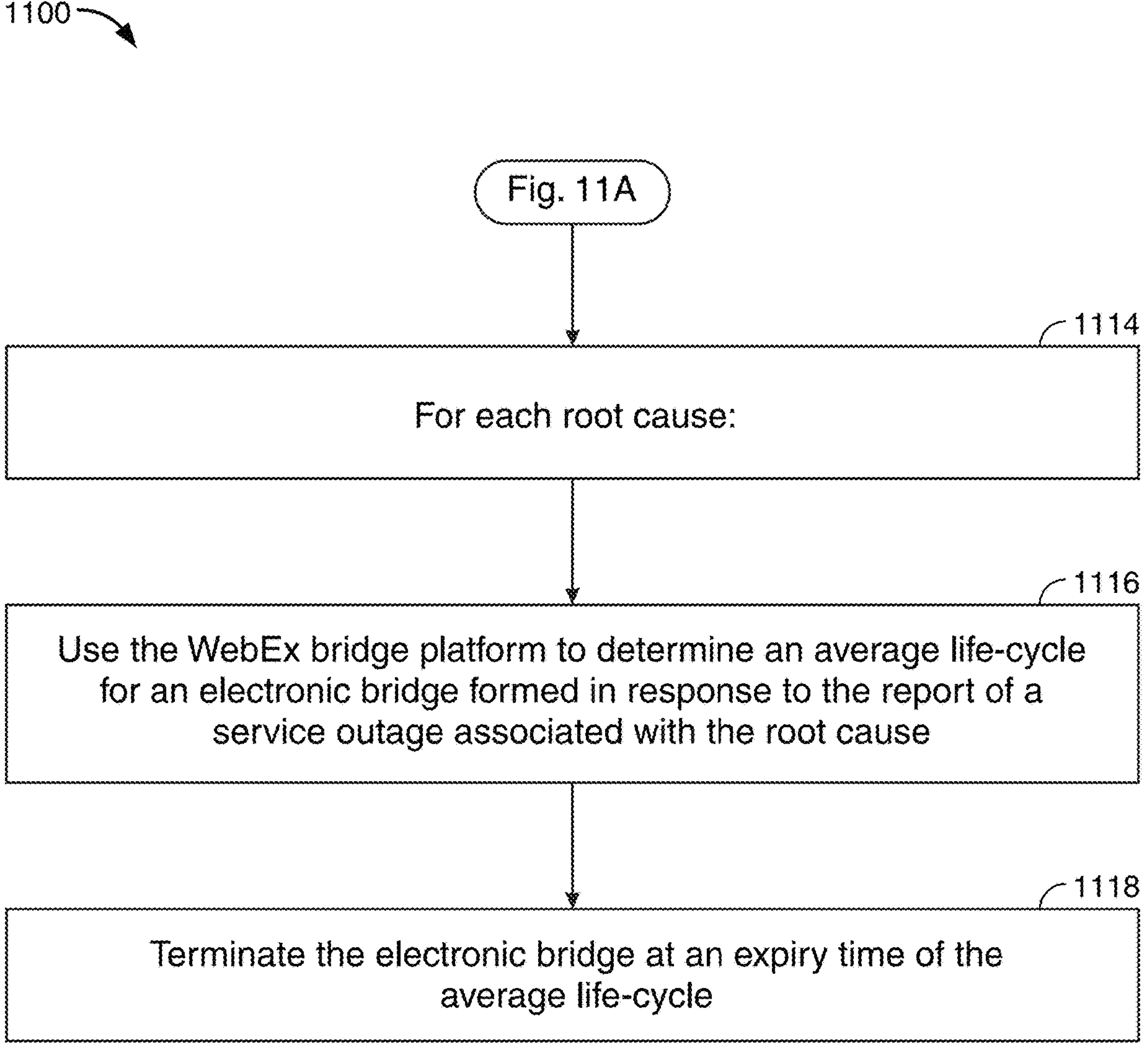

FIGS. 11A-B shows another illustrative flow diagram according to the principles of the disclosure. At 1102, the diagram shows a first part of a method, describing receiving a report of a service outage incident in a computer network. At 1104, the method shows arranging an LCB to serve as an electronic staging area to respond to the service outage incident.

The method then transmits an API call to a WebEx bridge platform for all bridge information available on the computer network. The bridge information may include electronic bridges that are currently being hosted by the WebEx bridge platform as well as responders that are currently involved in at least one electronic bridge.

At 1108, the WebEx bridge platform may be used to send an electronic prompt to the responders that are not involved in an electronic bridge to join the electronic bridge.

At 1110, the LCB may be added to the electronic bridges that are currently being hosted by the WebEx platform.

Thereafter, the WebEx platform may determine a root cause for each report of service outage incident in the computer network, as shown at 1112.

At 1114-1116, the root cause determination may be used by the WebEx platform to determine an average life-cycle for an electronic bridge formed in response to the report of a service outage associated with the root cause, and 1118 shows terminating the electronic bridge at an expiry time of the average-life cycle, preferable independently of activity on the bridge. It should be noted that, to the extent that activity on the bridge exceeds a pre-determined threshold termination may be overridden, or responders may be prompted to restart the bridge and/or reset the bridge to a previous level of operation.

The embodiments set forth herein focus on using the WebEx bridge to collect, in real-time, operational and functional data to determine the root cause and appropriate recovery steps. Such collection may include ingesting material, possibly through an application programming interface (API). Such collection may include filtering incoming material to redirect such information to pre-determined root cause-associated groups whereby each of the pre-determined groups is preferably focused on a discrete area of technology. Some metrics that may form part of the data collection may include user attendance, respondent paging, respondent actions, status updates, incident communications, transcripts of bridge-based calls, automated responses taken, and other collected data to analyze ongoing outages on an entity's network.

Such areas of technology which may form root causes may include ATM technology, communications technology, AI technology, and/or any other relevant technology.

The embodiments further focus on using the WebEx bridge to collect, in real-time, operational and functional data to provide actionable analytics. Such actionable analytics may combine real-time findings with actionable prompts which allow a user to act on current findings. For example, if the embodiments determine that weather in a certain part of the country has caused mass outages, then the embodiments may enable an entity to present a qualified member with an actionable prompt to enable selecting respondents, or at least call for respondents, to mitigate the weather root cause associated with the outages. Alternatively, if the embodiments determine that an outage, and associated request for respondent bridge participants, has not been acted upon for more than a pre-determined amount of time, the embodiments may present an actionable prompt to a qualified member to enable selecting respondents, or at least call for respondents, to mitigate the failure to respond to the outage. Accordingly, the embodiments may leverage the real-time data by adding the real-time data to large language models (LLMs) and monitoring system associated with one or more of the root cause-associated groups.

Such actionable prompts, and attendant graphics and sounds, may be tuned to match the criticality of the outage. For example, if an outage is customer-facing and, therefore, highly critical to the entity, then the graphics and sounds can be increased in order to more efficiently and more quickly gain the attention of one or more qualified members.

Some embodiments may invoke mobilization procedures by automatically instantiating a bridge, automatically paging and mobilizing related resources, and prompting participants to become involved, or request or cause others to become involved, in responsive courses of action. Such automatically paging and mobilizing related resources may preferably be based on LLM issue evaluation.

Certain embodiments may invoke self-heal capabilities based on LLM issue evaluation. Certain embodiments of systems according to the invention may feed real-time status reports for the self-heal attempt directly into the bridge. Such status reports may preferably be leveraged to dictate an uptick, or a down tick, in paging protocols. In addition, such status reports may form part of the record, or log, for future reference.

Preferably, systems and methods according to the embodiments may feed data back into the LLM and monitoring system to improve effectiveness and determine next steps as well as to continually train the model in an automated process.

Figure 12:
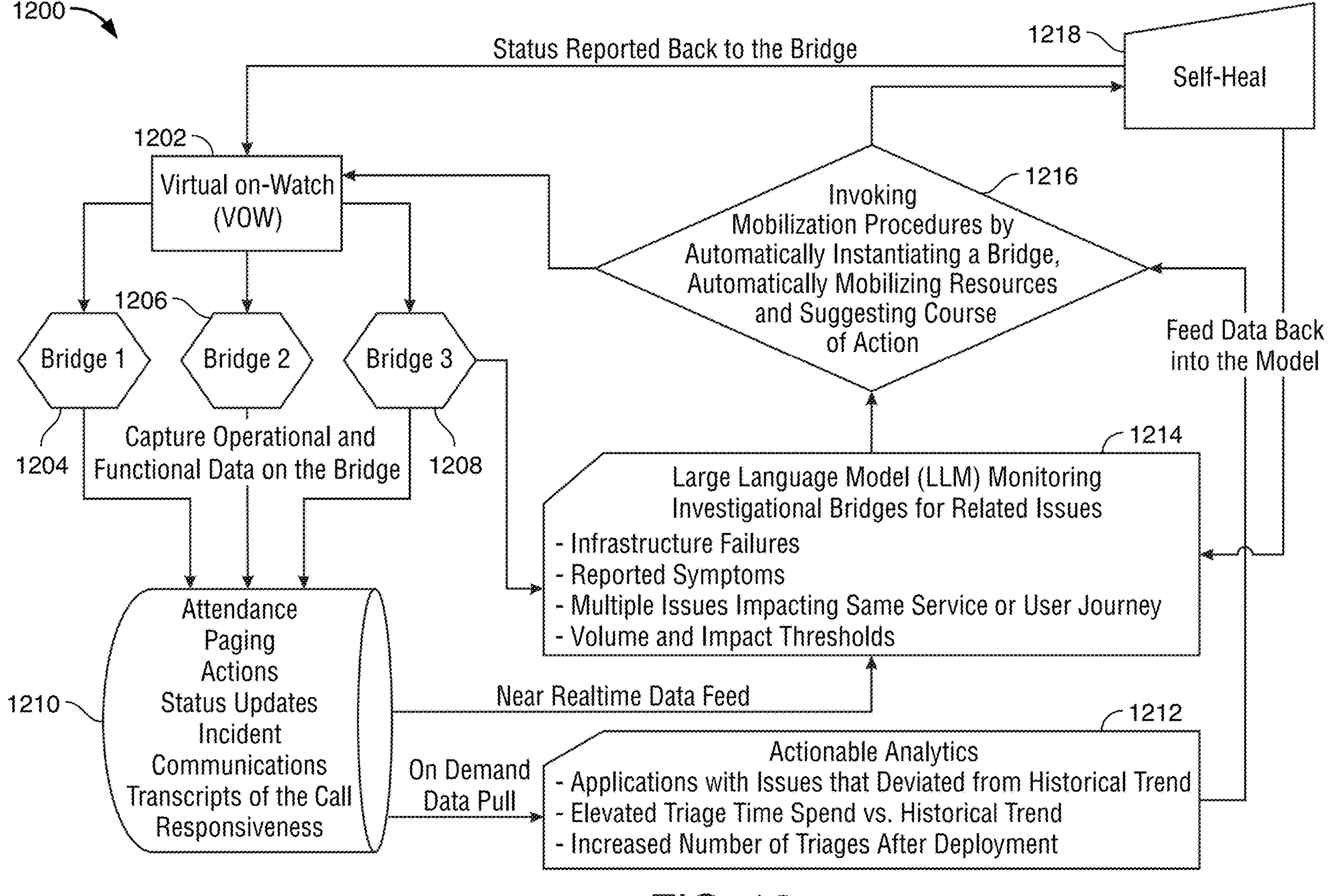
FIG. 12 shows yet another illustrative flow diagram according to the principles of the disclosure.

FIG. 12 shows yet another illustrative flow diagram according to the principles of the disclosure. At 1202, a virtual-on-watch (VOW) according to the embodiments is shown. A VOW preferably generates, enables, or otherwise interacts with, one or more bridges 1204, 1206 and 1208. Embodiments of bridges 1204, 1206 and 1208 preferably capture operational and functional data on the bridge. This data may preferably be leveraged for the remainder of the method 1200.

At 1210, the outputs from bridges 1204, 1206, 1208 can be considered data structured in various categories. Such categories include bridge attendance, paging (results of communications with relevant participants), actions taken from the bridge, status updates circulated to members of the bridge, incident alerts and reports, inter-bridge and intra-bridge communications, transcripts of bridge communications (such as bridge calls, bridge videoconferences, bridge-hosted messaging services, electronic mail, etc.) and responsiveness to bridge calls and communications.

The structured data may be transmitted to a Large Language Model monitoring system at 1214, preferably in a near real time data feed. Such a data feed may, in certain embodiments, be enabled but only in near-real time, and not necessarily in real time, because of the structuring requirements associated with the data.

In addition, the structured data at 1210 may preferably be available for an on-demand data pull for use with actionable analytics according to the embodiments, as shown at 1212. Such actionable analytics may be for use with identified applications with issues that deviated from historical trends, elevated triage resource consumption (such as with respect to one or more historical trends), and an increased number of triages in a post-triage (and fix) deployment period. It should be noted that such information is typically used with an on-demand data pull, as opposed to a periodic data feed or continuous data feed, because actionable analytics are only required subject to an action by a user, whereas a periodic data feed or continuous data feed may unnecessarily consume resources.

Bridge data derived from 1204, 1206 and 1208 may preferably be available to LLM 1214 in real time data feed. Such a data feed preferably may be in the form of computer log dumps or other preferably unstructured, unformatted and/or native format data using high-speed data streaming.

Unstructured, unformatted and/or native format data transferred to may be directly loaded to LLM and monitoring system (LLM) 1214. Thereafter, such unstructured, unformatted and/or native format data may be used to further build and/or refine the LLM to adapt to infrastructure failures reported symptoms, multiple issues impacting the same service or user journey and volume and impact thresholds.

Both actionable analytics 1212 and LLM 1214 may transfer information to feedback into a model for revision and presentation of preventative actions 1216. Such preventative actions may include invoking mobilization procedures by automatically instantiating a bridge, automatically mobilizing resources and suggesting one or more causes of action.

Once actionable analytics 1212 and LLM 1214 have transferred sufficient relevant data for implementing one or more self-heal algorithms at 1218, status may be reported back to one or more relevant bridges via VOW 1202. Alternatively, model for revision and presentation of preventative actions 1216 may transfer information directly to VOW 1202, where self-heal is not required or called for.

Where LLM 1214 detects and/or actionable analytics 1212 detects a failure at bridges 1204, 1206 and/or 1208, model 1216 may invoke self-heal mechanism 1218. In such embodiments, self-heal mechanism 1218 may transmit self-heal instructions to VOW 1202 for bridges 1204, 1206 and 1208. Self-heal instructions may also report on the success or failure of the self-heal instructions to model 1216 as training data.

Thus, methods and apparatus for providing actionable analytics based on virtual on-watch (VOW) data are provided. Persons skilled in the art will appreciate that the present invention can be practiced by other than the described embodiments, which are presented for purposes of illustration rather than of limitation, and that the present invention is limited only by the claims that follow.

What is claimed is:

1. A system comprising one or more non-transitory computer-readable media storing computer-executable instructions which, when executed by a processor on a computer system, execute self-healing of a network of computing devices, the system comprising:

a WebEx bridge platform including one or more life-cycle electronic bridges, the one or more life-cycle electronic bridges comprising electronic bridge information, the WebEx bridge platform comprising a receiver for receiving an API call to the WebEx bridge platform requesting the electronic bridge information;

a virtual on watch (VOW) processing system, said processing system for generating, enabling, or otherwise interacting with the one or more life-cycle electronic bridges, said life-cycle electronic bridges serving as an electronic staging area to respond to a service outage incident, said VOW comprising:

a processor;

a memory;

and communications lines coupled to the processor, the memory and each of the life-cycle electronic bridges;

a large language model and monitoring system (LLM), said LLM;

a database for receiving and structuring data from the one or more life-cycle electronic bridges; and an on-demand remediation system for executing self-healing algorithms at the one or more life-cycle electronic bridges, said self-healing algorithms for remediating an application trend that deviates at greater than a threshold value of a pre-determined metric from a historical baseline trend for the metric, said metric corresponding to an elevated triage resource consumption level, and for mitigating an increased number of post-triage life-cycle deployment occurrences;

wherein the LLM is further adapted to monitor for infrastructure failures, review reported symptoms, identify issues impacting user experience, and monitor for and review dynamic volume thresholds and dynamic impact thresholds; and wherein the application trend occurs in a first region and the mitigating the increased number of post-triage life-cycle deployment occurrences occurs in a second region.

2. The system of claim 1, wherein the LLM investigates one or more life-cycle electronic bridges to determine whether the one or more life-cycle electronic bridges relates to infrastructure failures.

3. The system of claim 1, wherein the LLM investigates one or more life-cycle electronic bridges to determine whether the one or more life-cycle electronic bridges relates to symptomatic behavior.

4. The system of claim 1, wherein the LLM investigates one or more life-cycle electronic bridges to determine whether the one or more life-cycle electronic bridges relate to multiple issues impacting a single service.

5. The system of claim 1, wherein the LLM investigates one or more life-cycle electronic bridges to determine whether the one or more life-cycle electronic bridges relates to volume thresholds.

6. The system of claim 1, wherein the LLM investigates one or more life-cycle electronic bridges to determine whether the one or more life-cycle electronic bridges relates to consumer-facing impact thresholds.

7. The system of claim 1, wherein the LLM is further configured to invoke mobilization procedures by automatically instantiating an additional life-cycle electronic bridge.

8. A method, for use with one or more non-transitory computer-readable media storing computer-executable instructions which, when executed by a processor on a computer system, execute self-healing of a network of computing devices, the method comprising:

receiving an application programming interface (API) call at a WebEx bridge platform, the API call requesting electronic bridge information, the WebEx bridge platform including one or more life-cycle electronic bridges, the one or more life-cycle electronic bridges comprising the electronic bridge information;

using a virtual on watch (VOW) processing system to generate, enable, or otherwise interact with the one or more life-cycle electronic bridges, said life-cycle electronic bridges serving as an electronic staging area to respond to a service outage incident, said VOW comprising a processor, a memory, and communications lines coupled to the processor, the memory and each of the life-cycle electronic bridges;

monitoring each of the life-cycle electronic bridges using a large language model and monitoring system (LLM);

receiving and structuring data received from the one or more life-cycle electronic bridges;

in response to a demand from a remediation system for executing self-healing algorithms at the one or more life-cycle electronic bridges, remediating an application metric that deviates at greater than a threshold value from a historical baseline trend associated with the metric, said remediated comprising responding to an elevated triage resource consumption level, said elevated triage resource consumption level that deviates at greater than a threshold value from a baseline triage resource consumption level; and mitigating an increased number of post-triage deployment occurrences in a location other than the location associated with the elevated triage resource consumption level;

wherein the LLM is further adapted to monitor for infrastructure failures, review reported symptoms, identify issues impacting user experience, and monitor for and review dynamic volume thresholds and dynamic impact thresholds; and wherein the application trend occurs in a first region and the mitigating the increased number of post-triage life-cycle deployment occurrences occurs in a second region.

9. The method of claim 8, wherein the LLM is further operable to investigate one or more life-cycle electronic bridges to determine whether the one or more life-cycle electronic bridges relates to infrastructure failures.

10. The method of claim 8, wherein the LLM is further operable to investigate one or more life-cycle electronic bridges to determine whether the one or more life-cycle electronic bridges relates to symptomatic behavior.

11. The method of claim 8, wherein the LLM is further operable to investigate one or more life-cycle electronic bridges to determine whether the one or more life-cycle electronic bridges relate to multiple issues impacting a single service.

12. The method of claim 8, wherein the LLM is further operable to investigate one or more life-cycle electronic bridges to determine whether the one or more life-cycle electronic bridges relates to volume thresholds.

13. The method of claim 8, wherein the LLM is further operable to investigate one or more life-cycle electronic bridges to determine whether the one or more life-cycle electronic bridges relates to consumer-facing impact thresholds.

14. The method of claim 8, where the LLM is further operable to invoke mobilization procedures by automatically instantiating an additional life-cycle electronic bridge.

* * * * *